US012765523B2

(12) United States Patent
Eide et al.

(10) Patent No.: US 12,765,523 B2
(45) Date of Patent: Oct. 20, 2026

(54) SUBMERSIBLE FISH FARM

(71) Applicant: Watermoon AS, Eikelandsosen (NO)

(72) Inventors: Erlend Eide, Bergen (NO); Sondre Eide, Eikelandsosen (NO)

(73) Assignee: WATERMOON AS, Eikelandsosen (NO)

( * ) Notice: Subject to any disclaimer, the term of this patent is extended or adjusted under 35 U.S.C. 154(b) by 294 days.

(21) Appl. No.: 18/281,046

(22) PCT Filed: Mar. 7, 2022

(86) PCT No.: PCT/NO2022/050062
§ 371 (c)(1),
(2) Date: Sep. 8, 2023

(87) PCT Pub. No.: WO2022/191715
PCT Pub. Date: Sep. 15, 2022

(65) Prior Publication Data

US 2024/0164352 A1 May 23, 2024

(30) Foreign Application Priority Data

Mar. 8, 2021 (NO) .................................. 20210295
Dec. 10, 2021 (NO) .................................. 20211497

(51) Int. Cl.
*A01K 61/65* (2017.01)
*A01K 63/04* (2006.01)
*A01K 61/80* (2017.01)

(52) U.S. Cl.
CPC ............ *A01K 61/65* (2017.01); *A01K 63/042* (2013.01); *A01K 63/047* (2013.01); *A01K 61/80* (2017.01)

(58) Field of Classification Search
CPC ...................................................... A01K 61/65
See application file for complete search history.

(56) References Cited

U.S. PATENT DOCUMENTS 3,653,358 A * 4/1972 Fremont ................ A01K 61/60
119/223
6,223,689 B1 * 5/2001 Nelson ................ A01K 63/042
119/239

(Continued)

FOREIGN PATENT DOCUMENTS

CA 3117937 A1 * 5/2020 ............ F03B 13/183
CA 3179600 A1 * 11/2021 ............ A01K 61/60

(Continued)

OTHER PUBLICATIONS

International Search Report issued May 27, 2022 in corresponding International Application No. PCT/NO2022/050062.

(Continued)

*Primary Examiner* — Morgan T Jordan
(74) *Attorney, Agent, or Firm* — Wenderoth, Lind & Ponack, L.L.P.

(57) ABSTRACT

The present invention relates to submersible fish rearing tank (100). The tank includes an exterior enclosure (17) forming a closed fish habitat. A utility transition element (110) provides a transition for at least one of a water inlet, a water outlet, a gas outlet, an air inlet, and connections for instrumentation, fixed to the exterior enclosure (17). At least one pump unit (101) is provided to pump water into the submersible fish rearing tank (100) to provide a pressure inside the submersible fish rearing tank (100) exceeding a pressure acting on the outside of the submersible fish rearing tank (100).

21 Claims, 12 Drawing Sheets

(56) References Cited

U.S. PATENT DOCUMENTS

| | | | | | |
|---|---|---|---|---|---|
| 8,371,245 | B2 * | 2/2013 | Papadoyianis | A01K 61/60 | 119/223 |
| 9,339,016 | B1 * | 5/2016 | Donovan | A01K 61/65 | |
| 2009/0288612 | A1 * | 11/2009 | Himmelstrup | B63B 21/50 | 114/230.1 |
| 2012/0006277 | A1 * | 1/2012 | Troy | A01K 61/65 | 119/226 |
| 2012/0167829 | A1 * | 7/2012 | Madsen | A01K 61/10 | 119/223 |
| 2015/0114304 | A1 * | 4/2015 | Pierce | A01K 63/065 | 119/200 |
| 2018/0177161 | A1 * | 6/2018 | Berge | A01K 79/00 | |
| 2019/0387721 | A1 * | 12/2019 | Dobson | A01K 61/60 | |
| 2020/0015460 | A1 * | 1/2020 | Gustavsen | A01K 61/60 | |
| 2021/0112785 | A1 * | 4/2021 | Krogenes | A01K 61/65 | |
| 2021/0169052 | A1 * | 6/2021 | Chang | A01K 61/60 | |
| 2021/0360905 | A1 * | 11/2021 | Van Leeuwen | A01K 61/60 | |
| 2022/0174918 | A1 * | 6/2022 | Fitzgerald | A01K 61/60 | |
| 2025/0000065 | A1 * | 1/2025 | Matre | A01K 63/042 | |

FOREIGN PATENT DOCUMENTS

| | | | | | |
|---|---|---|---|---|---|
| CN | 107439448 | A | * | 12/2017 | A01K 61/65 |
| CN | 109329150 | A | * | 2/2019 | A01K 61/65 |
| CN | 109479784 | A | * | 3/2019 | A01K 63/045 |
| CN | 110476856 | A | * | 11/2019 | A01K 61/65 |
| CN | 110495415 | A | * | 11/2019 | B01D 33/15 |
| CN | 110771545 | A | * | 2/2020 | A01K 61/60 |
| CN | 117562008 | A | * | 2/2020 | A01K 61/60 |
| CN | 111411620 | A | * | 7/2020 | A01K 61/60 |
| CN | 111418533 | A | * | 7/2020 | A01K 61/65 |
| CN | 112219767 | A | * | 1/2021 | A01K 61/65 |
| CN | 115530108 | A | * | 12/2022 | A01K 61/65 |
| CN | 117356499 | A | * | 1/2024 | A01K 61/60 |
| CN | 117546806 | A | * | 2/2024 | A01K 61/60 |
| CN | 118680107 | A | * | 9/2024 | F16F 15/067 |
| ES | 3005958 | T3 | * | 3/2025 | B63B 21/00 |
| JP | 6-276887 | | | 10/1994 | |
| KR | 20120034340 | A | * | 4/2012 | A01K 61/65 |
| KR | 20170109755 | A | * | 10/2017 | A01K 63/047 |
| KR | 101981496 | B1 | * | 5/2019 | A01K 63/042 |
| KR | 102676425 | B1 | * | 6/2024 | A01K 61/65 |
| KR | 102686550 | B1 | * | 7/2024 | B63B 22/00 |
| NO | 159512 | | | 10/1988 | |
| NO | 160753 | | | 2/1989 | |
| NO | 332341 | | | 9/2012 | |
| NO | 20120327 | | | 9/2012 | |
| NO | 20120097 | | | 1/2013 | |
| NO | 20111521 | | | 5/2013 | |
| NO | 335337 | | | 11/2014 | |
| NO | 20140350 | | | 9/2015 | |
| NO | 20170300 | | | 2/2017 | |
| NO | 20160358 | A1 | * | 9/2017 | A01K 61/00 |
| NO | 341974 | | | 3/2018 | |
| NO | 342094 | | | 3/2018 | |
| NO | 342421 | | | 5/2018 | |
| NO | 343380 | | | 2/2019 | |
| NO | 344480 | | | 1/2020 | |
| NZ | 778996 | A | * | 3/2024 | A01K 61/13 |
| WO | WO-9312651 | A1 | * | 7/1993 | A01K 61/10 |
| WO | WO-2017030445 | A1 | * | 2/2017 | A01K 61/60 |
| WO | 2018/016968 | | | 1/2018 | |
| WO | WO-2020013703 | A1 | * | 1/2020 | A01K 79/00 |

OTHER PUBLICATIONS

Norwegian Search Report issued Sep. 28, 2021 in corresponding Norwegian Application No. 20210295.

Norwegian Search Report issued Feb. 17, 2022 in corresponding Norwegian Application No. 20211497.

* cited by examiner

SUBMERSIBLE FISH FARM

FIELD OF THE INVENTION

The present invention relates to a submersible fish farm, and a method of operating a submersible fish farm.

BACKGROUND

One of the goals of the aquaculture industry is environmentally sustainable development. The industry is therefore producing solutions that achieve energy efficiency, reduction of fossil fuels and reduced climate footprint.

The spread of salmon lice and other disease infections is a major issue for the aquaculture industry. Escape of fish is also a problem especially for the wild salmon stock—and is often due to technical failure, incorrect use of equipment and vessels, or storms.

In addition, emissions in the aquaculture industry have increased, and the industry accounts for large amounts of seabed waste along coastal areas. The waste largely consists of waste from feed and faeces, but also waste from medical treatments and delousing. The environmental impact because of the waste is largest below or in the immediate vicinity of the fish farms, and the discharges could potentially affect life on the seabed and affect the environmental conditions near the sites.

The above-mentioned issues create a need for closed fish farms that reduce the environmental problems, and which ensure growth and sustainability in the future. To increase production, there is also a need for new locations in more weather-exposed areas at sea. Closed and semi-closed fish farms have been deployed to remedy the above problems. Some companies produce land-based facilities, but such plants require considerable land areas, increased energy and water consumption. Handling of sludge production yield significant costs.

The environment from which the fish is sought to be separated from. is mainly the upper water layer to avoid lice and other pathogens, while the waste substances are released into the bottom as in traditional cages. Disadvantages of these solutions include that they are cumbersome to operate, and they do not sufficiently reduce seabed pollution.

It is an object of the invention to provide an easy to transport, energy efficient, closed, submersible fish rearing facility with low weight and that is cost efficient, easy to deploy and easy to maintain. It is also an object of the invention to provide a facility that is adapted to be submerged below the upper water layers of the sea to avoid sea-lice, harsh weather conditions and floating debris. Finally, it is an object of the invention to provide controlled water treatment, evenly distributed water flow within the facility, and controlled waste discharge to obtain ideal fish rearing conditions and environmentally friendly production.

SUMMARY OF THE INVENTION

The present invention relates to a submersible fish rearing tank. The submersible fish rearing tank includes an exterior enclosure forming a closed fish habitat. A utility transition element provides a transition for at least one of a water inlet, a water outlet, a gas outlet, an air inlet, and connections for instrumentation, fixed to the exterior enclosure. At least one pump unit is adapted to pump water into the submersible fish rearing tank to provide a pressure inside the submersible fish rearing tank exceeding a pressure acting on the outside of the submersible fish rearing tank.

The submersible fish rearing tank may further include a lower support plate, at least one inlet water supply column with nozzles adapted to provide water into the submersible fish rearing tank fixed in relation to the exterior enclosure and at least one pump unit adapted to pump water into the tank through the water supply column via the nozzles. A water discharge column extends along a central axis of the tank between the utility transition element and the lower support plate. The water discharge column includes a plurality of discharge ports in a discharge column wall, and a water discharge column outlet, whereby the at least one pump unit is adapted to provide the pressure inside the submersible fish rearing tank exceeding the pressure acting on the outside of the submersible fish rearing tank.

The exterior enclosure may be made of a flexible material.

The submersible fish rearing tank may include two tubular inlet water supply columns with nozzles adapted to supply water to the inside of the tank, each including at least one a pump unit.

Each tubular inlet water supply column may include two pump units.

The submersible fish rearing tank may further include an air inlet element at a lower part of the tank.

The nozzles may be adapted to provide water into the tank and may be directed with a tangential component inside the tank to generate a circular or spiral shaped waterflow inside the tank in a direction from the inner wall of the tank and towards the water discharge column.

The water discharge column may furthermore include an inner tube extending vertically along the centre axis of the water discharge column from the lower support plate to the utility transition element.

The submersible fish rearing tank may further include a flow restriction or throttle to reduce or completely close the outlet water flow from the water discharge column outlet to maintain the pressure inside the submersible fish rearing tank above the pressure acting on the outside of the submersible fish rearing tank.

The submersible fish rearing tank may further include a ballast and an adjustable buoyancy element to orient and maintain the buoyancy of the submersible fish rearing tank.

Furthermore, the invention relates to a method of operating the submersible fish rearing tank, including controlling the flow restriction in coordination with the at least one pump unit to maintain one of a substantially constant pressure and a constant flow inside the submersible fish rearing tank while changing one of a waterflow through the at least one pump unit and the flow restriction.

The present disclosure refers to “pumps” and “pump units”. These expressions are intended to cover a broad interpretation of flow inducing machines and solutions including flow inducing mechanisms such as gas lift mechanisms, impeller pumps, radial pumps and tangential pumps. The invention does not exclude piston pumps.

DETAILED DESCRIPTION OF EMBODIMENTS

Figure 1:
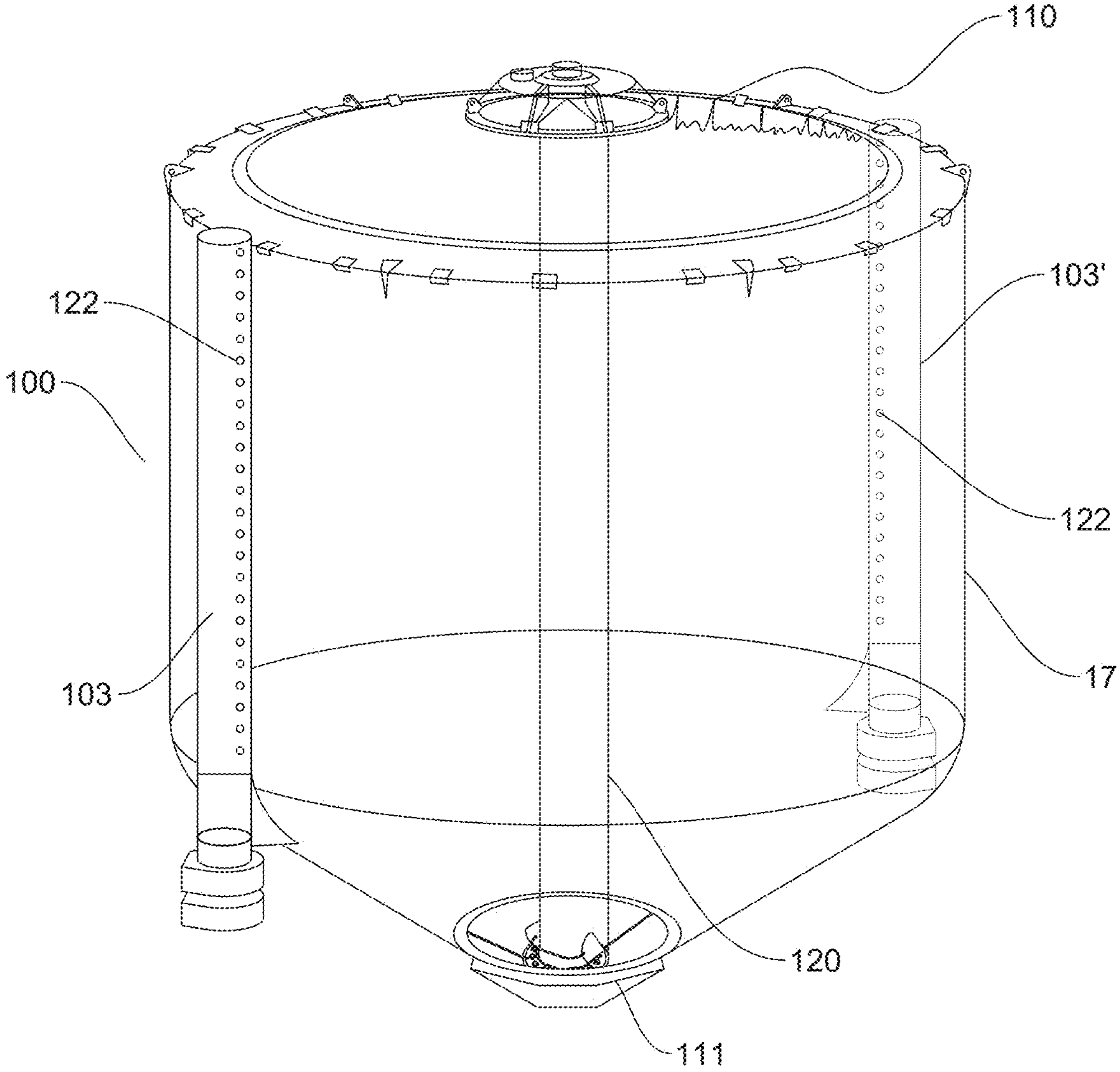
FIG. 1 is a transparent perspective view of a submersible fish farm of a first embodiment of the invention.

FIG. 1 is a transparent perspective view of a submersible fish farm 10 according to the invention deployed in water. The submersible fish farm 10 includes an underwater fish rearing tank 100.

The tank 100 further includes an exterior enclosure 17, a utility transition element 110 and a lower support plate 111 forming a closed habitat for fish. The habitat must be sufficiently closed to allow a pressure to build up inside the tank and to keep unwanted elements from entering the tank. Unwanted elements include parasites, jellyfish, plankton, and algae. Although the tank is closed, the tank 100 receive typically ambient water (freshwater, saline water, or seawater), fluids such as air and oxygen, and feed, and furthermore discharge used water and waste. Intake and discharge may be autonomously controlled by a controller connected to a plurality of sensors and cameras installed in the tank, thereby allowing controlled water treatment and flow for achieving optimal fish rearing conditions and optimal power usage. The pressure inside the tank prevents ingress of unwanted elements in the event of a leak.

Incoming and outgoing water may be filtered to prevent sea lice from entering the tank, and from polluting the surrounding environment, although the tank water may be replaced in such a rate that sea lice would not be able to latch on to the fish.

The exterior enclosure 17 is preferably a membrane made of a flexible material such as PE, PVC, latex, nylon or any impermeable and flexible plastic or fabric material. The membrane may also be semi-permeable. The exterior enclosure 17 may also be made of a rigid material forming a rigid tank structure. The exterior enclosure 17 is fixed to the utility transition element 110 and to the lower support plate 111. The utility transition element 110 and the lower support plate 111 are rigid and preferably made of metal, plastic, or composite materials. The material does not need to be totally impermeable.

The exterior enclosure 17 may be equipped with a zipper 18 for opening the enclosure 17 for accessing the inside of the tank, e.g., for cleaning, replacing, or performing maintenance on internal components.

The submersible fish farm 10 may be deployed and operated offshore, in coastal areas or in freshwater lakes.

FIG. 1 further shows that the underwater fish rearing tank 100 includes a first water supply column 103 and a second water supply column 103' attached to the exterior enclosure 17 on diametrically opposite sides. Each water supply column 103, 103' is a tubular and elongated structure, preferably cylindrical but may have a rectangular or elliptical cross-section, extending vertically along the exterior of the tank 100 in parallel with the vertical centre axis of the tank 100. The first water supply column 103 and a second water supply column 103' attached to the exterior enclosure 17 may be curved to accommodate the shape of the submersible fish rearing tank 100 and may be integrated into a wall exterior enclosure 17.

The tank 100 may include additional water supply columns (not shown) attached to the exterior enclosure 17, preferably having the same circumferential distance between each other.

The water supply columns 103, 103', are typically also made of a flexible fabric, sheet, canvas or a tarpaulin like material that will be inflated as the pressure inside the water supply columns 103, 103' is greater than the ambient pressure. The material is typically a light-weight flexible plastic material. Suitable materials include PE, PVC, latex, nylon or any impermeable, rigid, or flexible plastic or fabric material.

The underwater fish rearing tank 100 further comprises a central water discharge column 120 inside the tank 100. The central water discharge column 120, which is connected to and extending between the utility transition element 110 and the lower support plate 111, is preferably cylindrical and oriented vertically along the vertical centre axis of the tank 100 which advantageously also acts as a support column between the utility transition element 110 and the lower support plate 111. The water discharge column 120 is adapted to lead internal pressurized water out of the tank 100. The support plates 110, 111 provides connections and bases for the various utilities.

Figure 2:
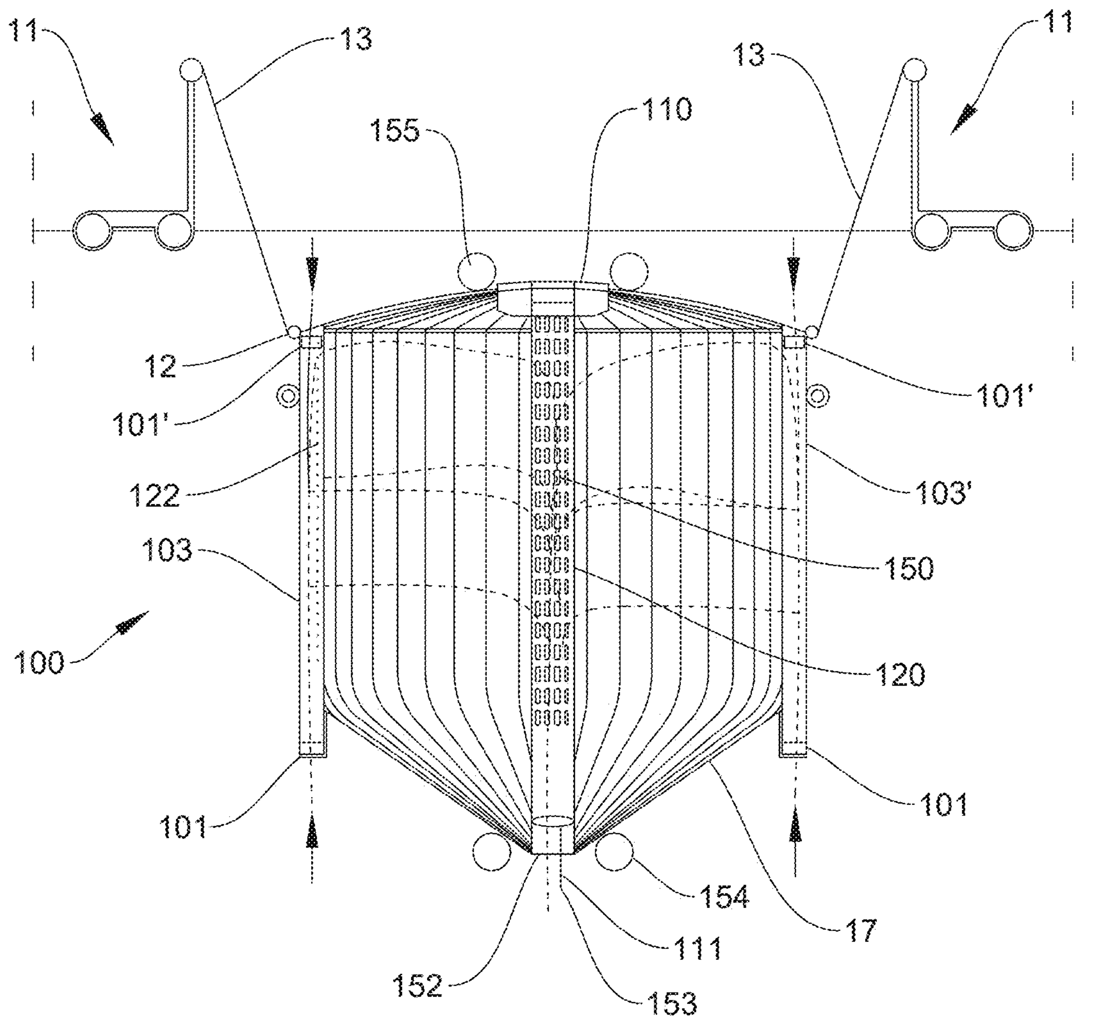
FIG. 2 is a cross-sectional side view of the underwater fish rearing tank of the invention.

The utility transition element 110 includes a buoyancy element 155 (see FIG. 2). A gas pocket 138 (FIG. 3), and the lower support plate 111 includes a weight element 154 (see in FIG. 2), such as a heavy solid material. The utility transition element 110 and the lower support plate 111, also acting as a utility transition element, and the water discharge column 120, keep the tank 100 floating and aligned in an upright position.

Each water supply column 103, 103' is secured to the exterior enclosure 17 over an attachment length that is shorter than the length of the central water discharge column 120. As an alternative the water supply column 103, 103' may be sealed to a continuous part of the exterior enclosure 17. The outlets of the nozzles in each water supply column 103, 103' must clearly be inside the exterior enclosure 17 but the water supply column 103, 103' may be located at the inside or the outside. Consequently, as shown in FIG. 1, the exterior enclosure 17 may form a cylindrical mid-section along the said attachment length, a plate-shaped top-section and a cone-shaped bottom-section. An advantage of the cone-shaped bottom-section is that its inclination will cause debris and dead fish to slide downwards and accumulate on top of the lower support plate 111 from where it will be extracted, preventing accumulation of debris and dead fish in corners of the tank 100 which may be difficult to remove.

Each water supply column 103, 103' includes nozzles 122 aligned vertically along a surface of the water supply column 103, 103'. The nozzles 122 have outlets inside of the tank 100. In an embodiment where the water supply column 103, 103' are sealed to a continuous part of the exterior enclosure 17, the exterior enclosure 17 are provided with holes corresponding with the nozzles 122 so that the water supply columns 103, 103' are in fluid communication with the inside of the tank 100 as explained above. The nozzles 122 are oriented at an angle with a tangential component to create rotational flow inside the tank, which is evident from FIG. 12. The nozzles of each of the supply columns 103, 103' are thus oriented in substantially the same general direction to create the rotational flow inside the tank. The lower part of the tank does not include water supply nozzles to reduce flow and to allow faeces and dead fish settle at the bottom for removal.

FIG. 2 is a cross-sectional side view of the underwater fish rearing tank 100 according to the invention. Each water supply column 103, 103' includes a lower water inlet pump unit 101 located on its lower end. Each water supply column 103, 103' may also include an upper water inlet pump unit 101'. Each water inlet pump unit 101, 101' includes a water inlet (see FIG. 9) and a water pump mechanism such as an airlift pump or an impeller (see FIG. 9) for drawing clean ambient water into the water supply column 103, 103' and into the underwater fish rearing tank 100 via the nozzles 122 in the water supply column 103 with nozzle outlets inside the tank 100. The pump may be actuated by a topside controller (not shown) manually or autonomously based on data retrieved from sensors included in the tank 100. The lower water inlet pump unit 101, 101' serves to provide flow and impose hydrostatic pressure within the tank, to create a rotational fluid flow inside the tank 100 and to exchange water for the fish.

The water discharge column 120 has nozzles forming discharge ports 150 on its surface though which water flow from the inside of the tank 100. The discharge ports 150 extends from the top of the column 120 and to a level substantially aligned with the level which the exterior enclosure 17 narrows. Resultingly, water inside the lower cone-shaped part of the tank 100 is not exchanged at the same rate as volume above the cone-shaped part. Therefore, dead fish and debris is allowed to settle. The fish will avoid the lower part of the tank 100, and this will contribute to reduce flow and water currents in the lower part.

FIG. 2 shows (see dotted lines) that water is drawn from the outside of the tank 100 and into the water supply columns 103, 103' and subsequently into the tank 100 via the nozzles 122 with outlets. FIG. 2 further shows that the water discharge column 120 has a water discharge column outlet 152 at its lower end, though which internal water is discharged. The water discharge column outlet 152 is includes a flow restriction or throttle 153 which may reduce or completely close the outlet water flow and thereby build hydrodynamic pressure within the tank 100 in order to at least keep the flexible exterior enclosure 17 inflated and stretched out to maximize the internal volume and maintain rigidity. The throttle 153 is typically coordinated with the pumps to maintain the pressure inside the tank to accommodate for difference in flow. The flow may be adjusted to accommodate for varying fish size as larger fish requires higher flow.

The pressure difference between the outside and the inside of the tank allows the water discharge column 120 to passively expel water from inside the tank 100 via its discharge ports 150 and out through the water discharge column outlet 152. Water is passed horizontally between the nozzles 122 of the water supply columns 103, 103' and discharge ports 150 of the water discharge column 120 is level. This creates an evenly distributed water flow inside the entire tank with the exception of the water at the bottom of the tank, avoiding accumulation of stale water in certain areas of the tank, facilitating water replacement while allowing sedimentation and settling of dead fish and faeces at the bottom. The weight element or ballast 154 combined with the adjustable buoyancy element 155 ensures that the submerged fish rearing tank 100 stays in an upright position.

Figure 3:
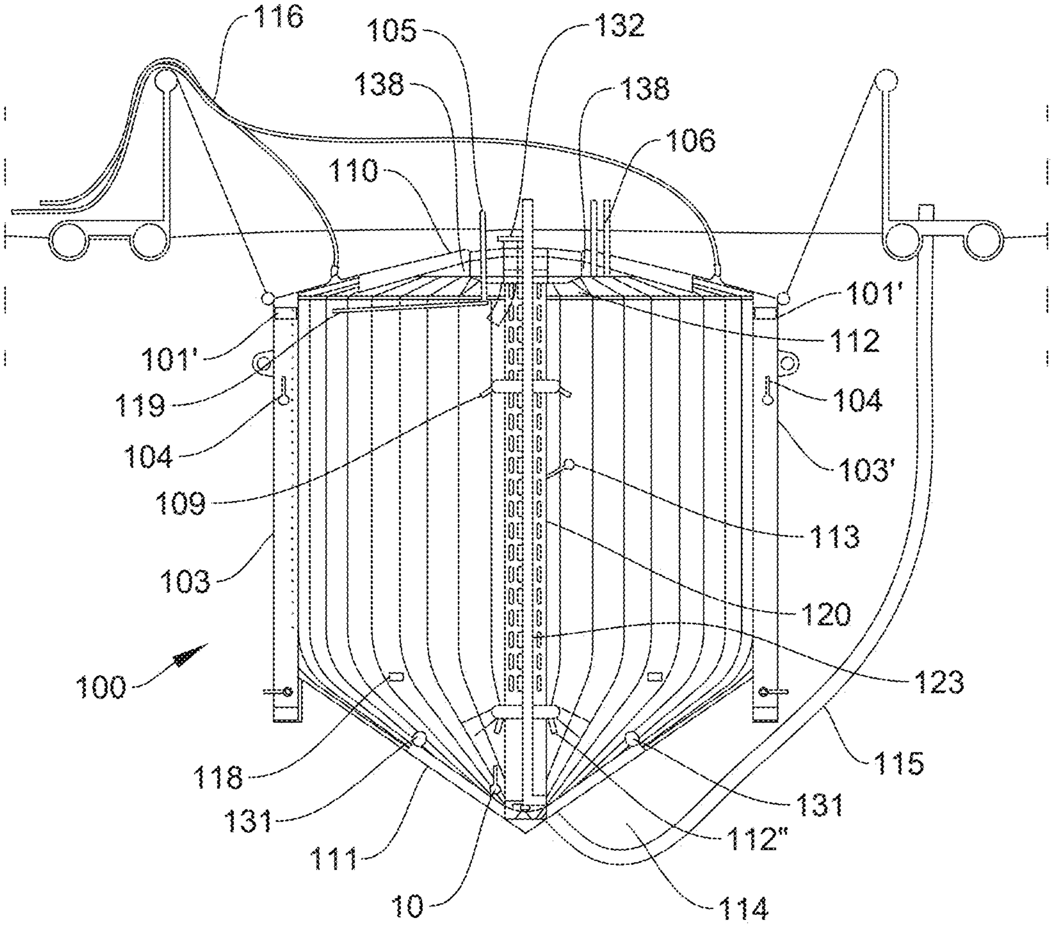
FIG. 3 corresponds to FIG. 2 and include more details.

FIG. 3 is a more detailed version of FIG. 2. The tank 100 includes a feed supply tube 116 extending to a feed supply inlet 105 through the utility transition element 110 and is connected a feed dispenser tube 119 located in an upper portion of the tank 100 and extending radially from the centre of the tank 100.

The tank 100 may further include fish monitoring cameras 109 for observing fish behaviour.

Each water supply column 103, 103' may include a water sensor 104 for measuring water quality parameters, such as oxygen level, or for detecting sea-lice or debris. The water sensor 104 is connected to a topside controller (not shown).

The tank 100 may include one or several auxiliary sensors 113 attached to the water discharge column 120. Auxiliary sensors 113 may be located on any rigid internal component or may be suspended from the utility transition element 110 of the tank 100 measuring water quality parameters such as oxygen level, temperature, pressure, visibility and any other parameter relevant for fish rearing conditions. The sensors may pass data to a topside controller which may accordingly adjust inflow and outflow of water. A drop in the internal water pressure may indicate leakage, malfunctioning pumps or a malfunctioning outlet throttle 153 which may signal a warning to personnel.

The tank 100 includes a plurality of upper light sources 112 attached to the inside of the utility transition element 110 surrounding the water discharge column 120. The tank 100 may also include a plurality of lower light sources 112' attached to the water discharge column 120, attached to a bottom half of the water discharge column 120, attached to the utility transition element 110 or be suspended from the utility transition element 110.

The water discharge column 120 includes at least one inner tube 123 for dead fish removal extending along water discharge column 120 from the lower support plate 111 to an outlet in the utility transition element 110.

FIG. 3 further shows at least one gas pocket 138 for containing excess gas produced in the tank 100. In FIG. 3 the gas pocket 138 is in fluid connection with a ventilation tube 106 or ventilation valves 134 (see FIG. 5) extending above the sea surface or to a location below the sea surface. Gas generated or lead inside the tank accumulates in the gas pocket 138. The accumulated gas may be released by the ventilation valves 134, and the ventilation valves 134 may be connected to a topside manually or automatically operable controller. An oxygen inlet element/fluid dispenser ring 131 may be provided to introduce oxygen in the event the oxygen levels become too low, for instance if the inlet pumps should fail or for some other reason. The oxygen inlet element/fluid dispenser ring 131 is shown as a tubular ring with perforations.

An air inlet element 118 indicated as a ring with square cross section may be provided to introduce air is typically connected to an air compressor via an air hose. Separate water and waste tubing 115 from water and waste outlet 114 is provided as an alternative to withdraw water from the water discharge column 120.

Figure 4:
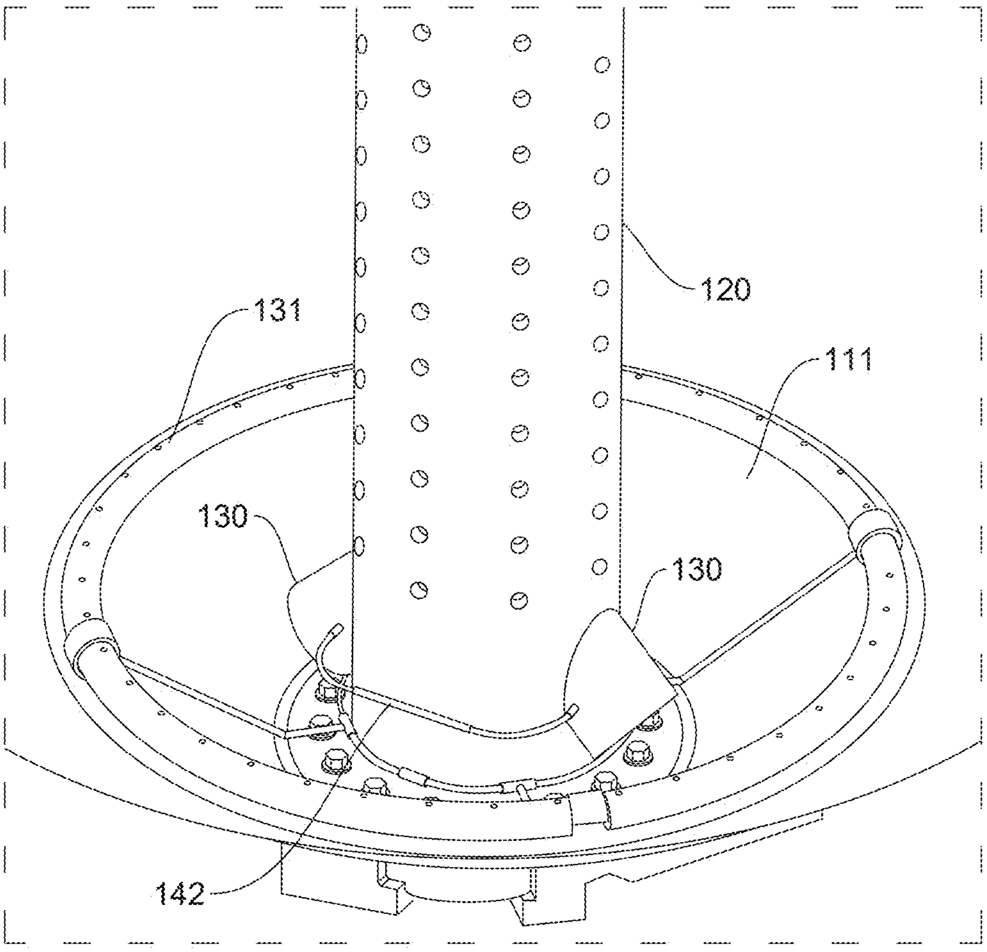
FIG. 4 is a perspective view of a lower support plate from an inside of the fish rearing tank.

FIG. 4 is a perspective view of the lower support plate 110 from inside the underwater fish rearing tank 100. Waste such as debris, dead fish, sludge and feed is accumulated at the bottom of the tank 100 on top of the lower support plate 110. The water discharge column 120 includes two vacuum inlets 130 on its lower end in fluid connection with the inner tube for dead fish removal extending along water discharge column 120 from the lower support plate 111 to an outlet in the utility transition element 110 (not shown) for collecting waste from the lower support plate 111 and transporting it to a topside deposit via the inner tube 123 (FIG. 3)

Air supply tube 142 provide pressurized air and bubbles inside the inner tube to provide water lift and suction in the two vacuum inlets 130 to extract the waste settling at the bottom.

The lower support plate 111 may be provided with a fluid dispenser ring 131 along its circumference encircling the water discharge column 120. The fluid dispenser ring 131 is in fluid connection with a topside pump providing oxygen, nitrogen, or air which is dispensed through nozzles in the ring 131 and distributed throughout the tank volume. The fluid dispenser ring 131 may e.g. oxygenate the water or create air bubbles serving as an air source for the fish. The fluid dispenser ring 131 may be actuated manually or autonomously by a topside controller based on values retrieved from sensors inside the tank 100 (see FIG. 3). Fish behaviour may be observed through cameras 109 (see FIG. 3) which may determine whether the fish needs increased air supply. The cameras 109 may also be used to record, monitor and indicate water quality, fish welfare, extraction of waste and debris, damage to tank components etc.

Figure 5:
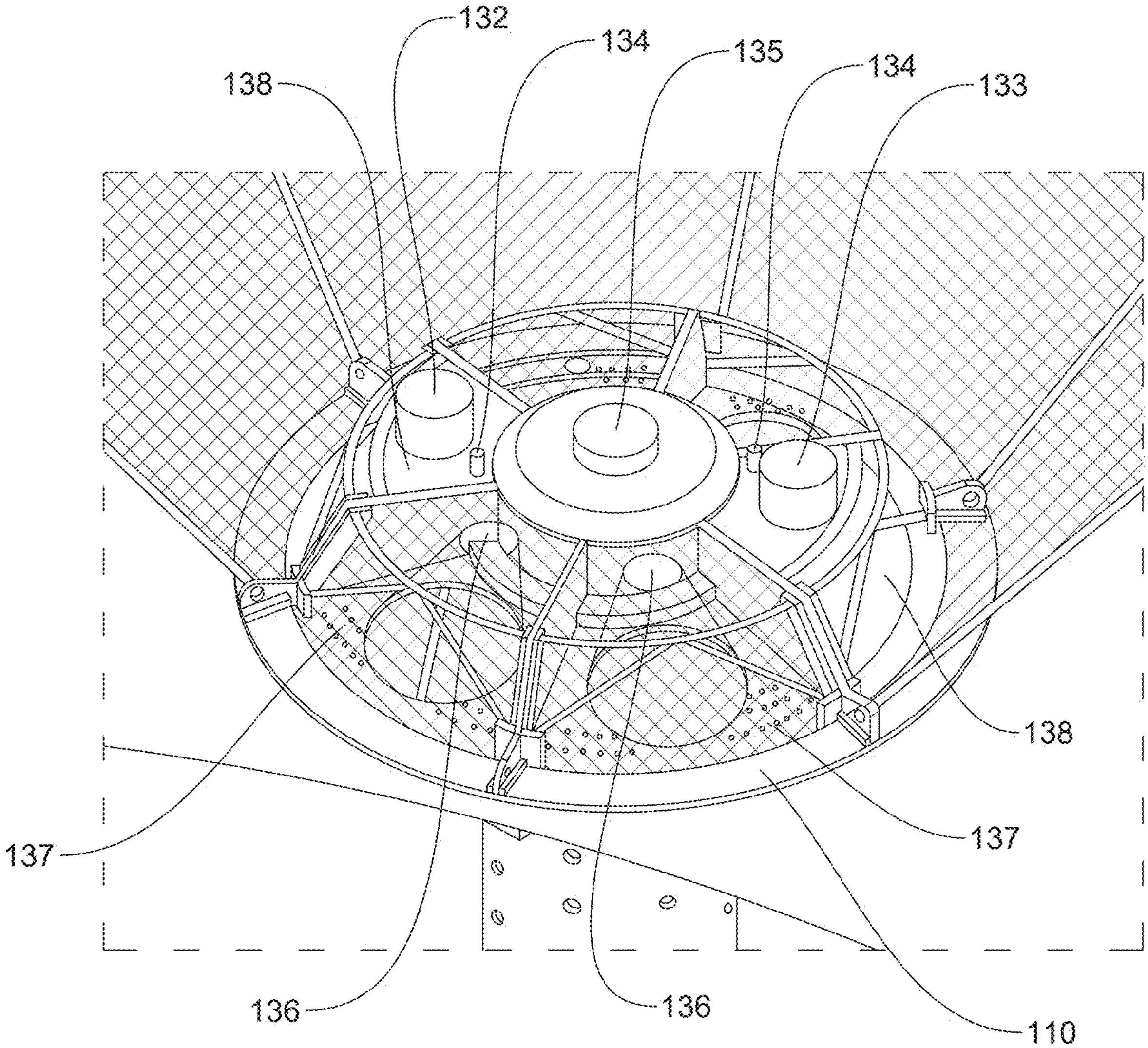
FIG. 5 is a perspective view of a utility transition element.

FIG. 5 is a perspective view of the utility transition element 110 seen from above. The utility transition element 110 includes a fish inlet 132 though which fish is inserted into the tank 100 typically via a hose. The fish inlet 132 is connected to a fish outlet 139 (see FIG. 6) located on the inside of the tank.

FIG. 5 further shows a waste outlet 135, an extension of the inner tube 123 (not shown), to which a hose or a tube may be connected to transport waste from the inner tube to a topside deposit.

FIG. 5 further shows a feed inlet 133 to which a hose or a tube may be connected to transport feed into the tank. The feed inlet 133 is connected to the feed dispenser tube 119 (see FIG. 6) inside the tank. FIG. 5 further shows ventilation valves 134 for discharging excess gas contained in the excess gas pocket 138 (also see FIG. 3). The ventilation valves 134 may be remotely operated. Gas may be accumulated in the gas pocket 138 to provide buoyancy to the tank 100.

The utility transition element 110 includes fish passages 136 (see FIG. 6 to FIG. 8) through which fish may be let out or extracted via hoses. The fish passages 136 may be cone shaped. Support plate nozzles 137 are provided to allow natural or artificial light pass through to lure the fish through the utility transition element 110 via the fish passages 136.

Figure 6:
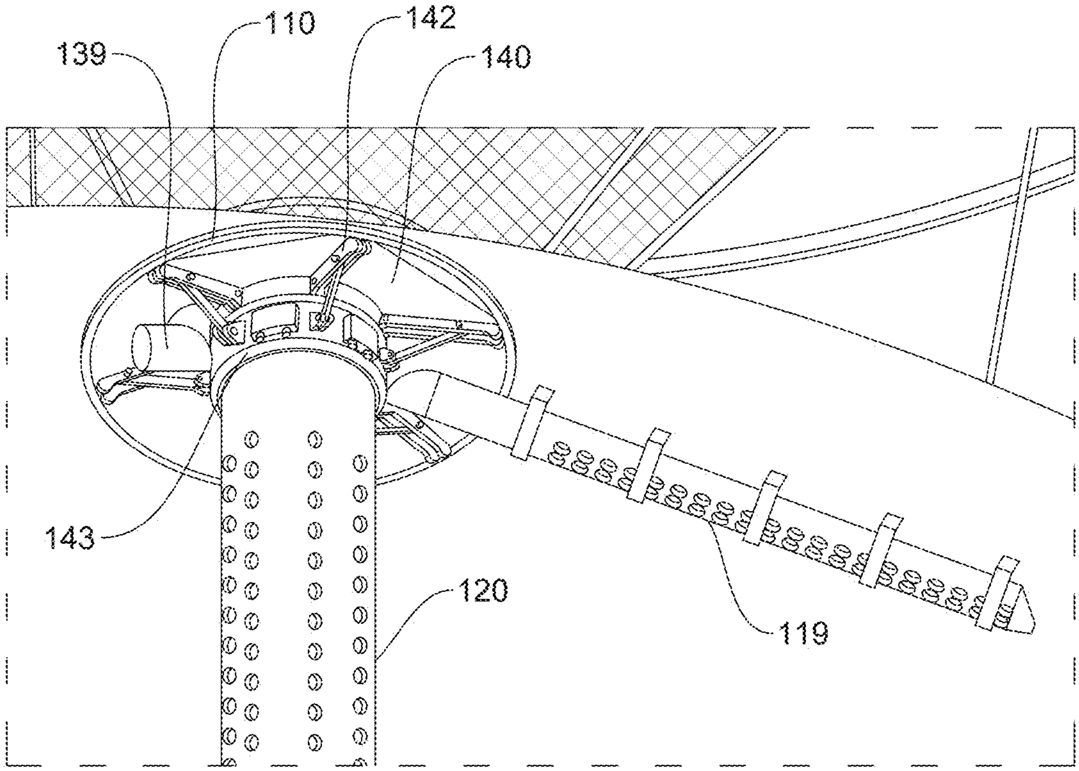
FIG. 6 is a perspective view of the utility transition element from an inside of the fish rearing tank.

FIG. 6 is a perspective view of the utility transition element 110 from inside the underwater fish rearing tank 100 (see FIG. 3). FIG. 6 shows the fish outlet 139 located directly below the plate 110 and the feed dispenser tube 119 extending radially from away from the water discharge column 120.

FIG. 6 further shows a support collar 143 fixed to the top end of the water discharge column 120 supporting a plurality of radially oriented cantilever arms. The support collar 143 may be electrically or hydraulically actuated to move up or down along the water discharge column 120 to actuate radially oriented cantilever arms to pivot and extend or retract in a manner resembling an umbrella mechanism. The cantilever arms are attached to a substantially circular membrane 140 serving as a hatch or valve for the fish outlets 139.

Figure 7:
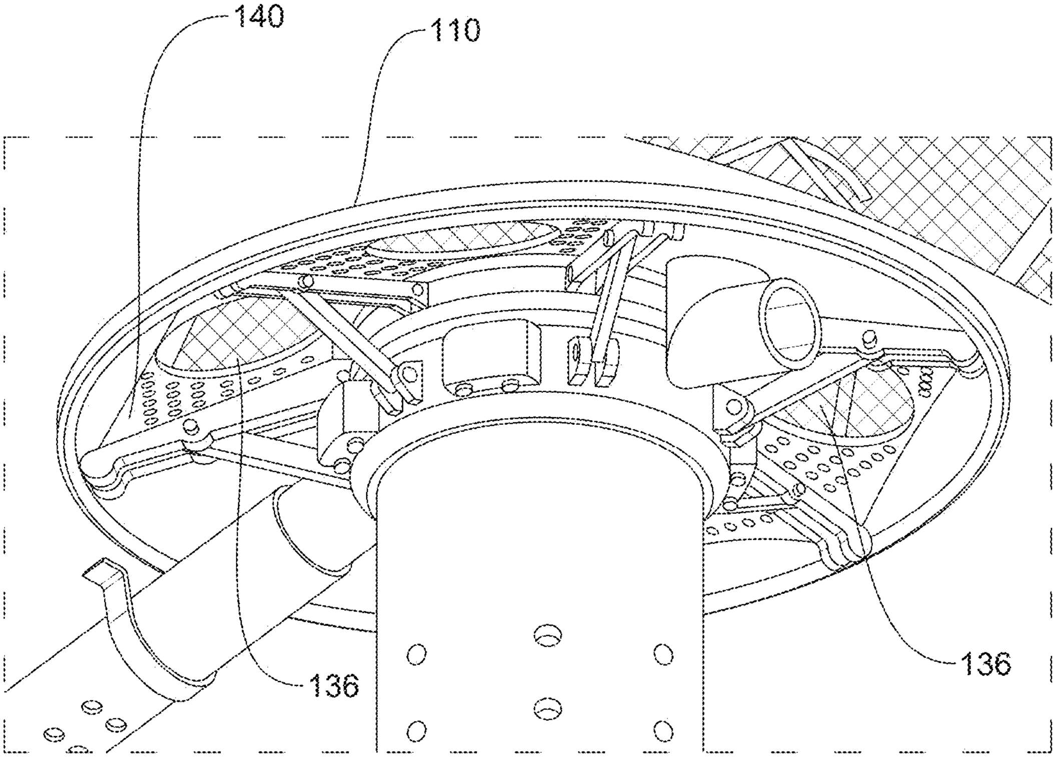
FIG. 7 is a perspective view or the utility transition element from inside of the fish rearing tank.

FIG. 7 is a perspective view or the utility transition element 110 from inside the underwater fish rearing tank 100 (see FIG. 3) where the membrane 140 is depicted transparently. FIG. 7 shows how the membrane 140 creates a barrier between the fish passages 136 and the tank 100, preventing fish from escaping the tank 100. The membrane 140 forms a valve and seals the fish passages 136. The membrane 140 is pressed towards the passages due to the internal pressure of the tank.

Figure 8:
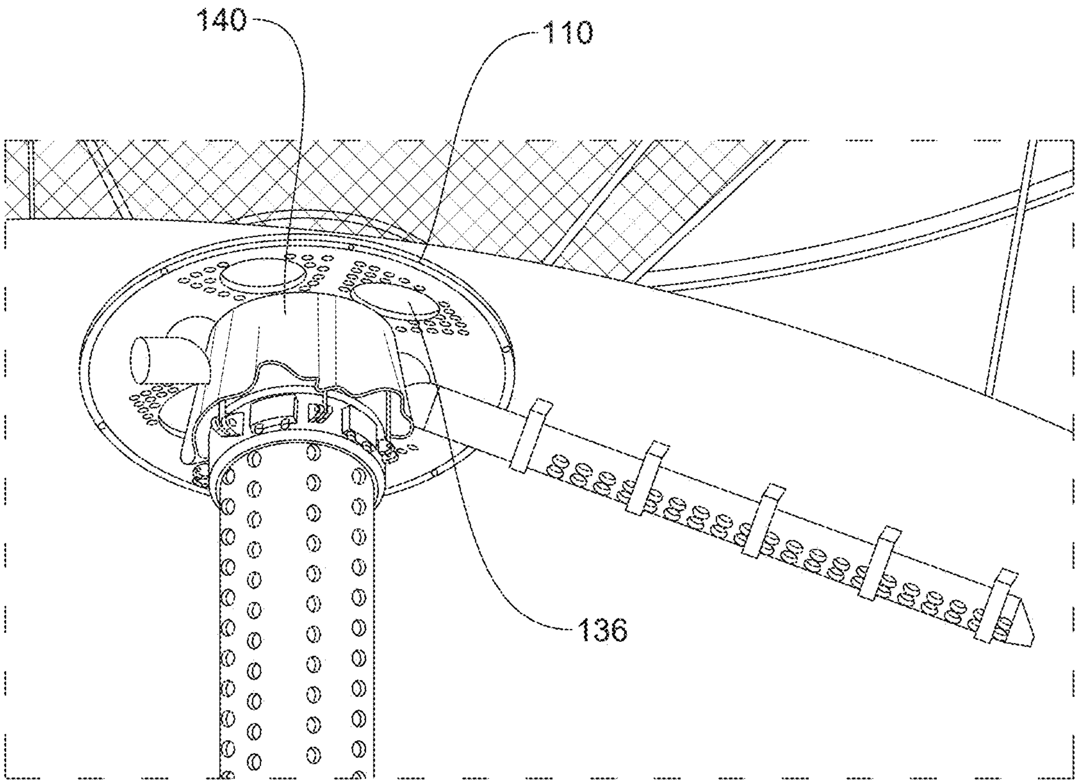
FIG. 8 is a further perspective view of the utility transition element from inside the fish rearing tank.

FIG. 8 is a perspective view of the utility transition element 110 from inside the fish rearing tank 100 (see FIG. 3). In FIG. 8, the cantilever arms are retracted and pivoted against the water discharge column 120. Consequently, the membrane 140 is folded back and retracted so that the fish passages 136 and the support plate nozzles 137 are exposed.

When the fish are ready for termination and extraction, the membrane 140 is retracted which allows light through the utility transition element nozzles 137. Salmonoids follow vertically oriented light movements and the fish will thus be lured towards the surface through the fish passages 136.

Figure 9:
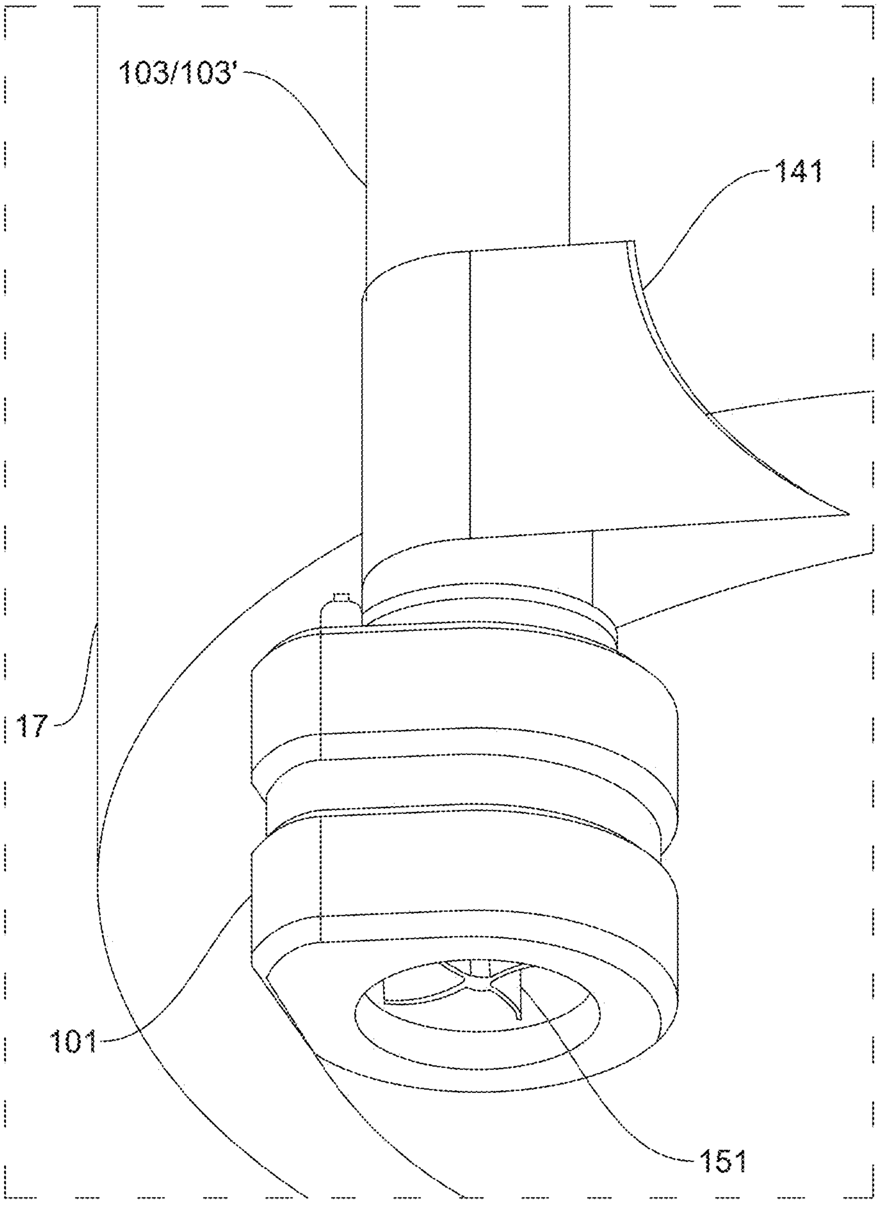
FIG. 9 is a perspective view of a lower water inlet pump unit as seen in FIG. 2.

FIG. 9 is a perspective view of the lower water inlet pump unit 101 as seen in FIG. 2. The depicted unit is also applicable for the upper water inlet pump unit 101'. The lower end of the water supply column 103 may be secured to the exterior enclosure 17 by means of a flexible membrane segment 141. Each water inlet pump unit 101, 101' may include an impeller 151 drawing water into the respective water supply column 103, 103'.

Figure 10:
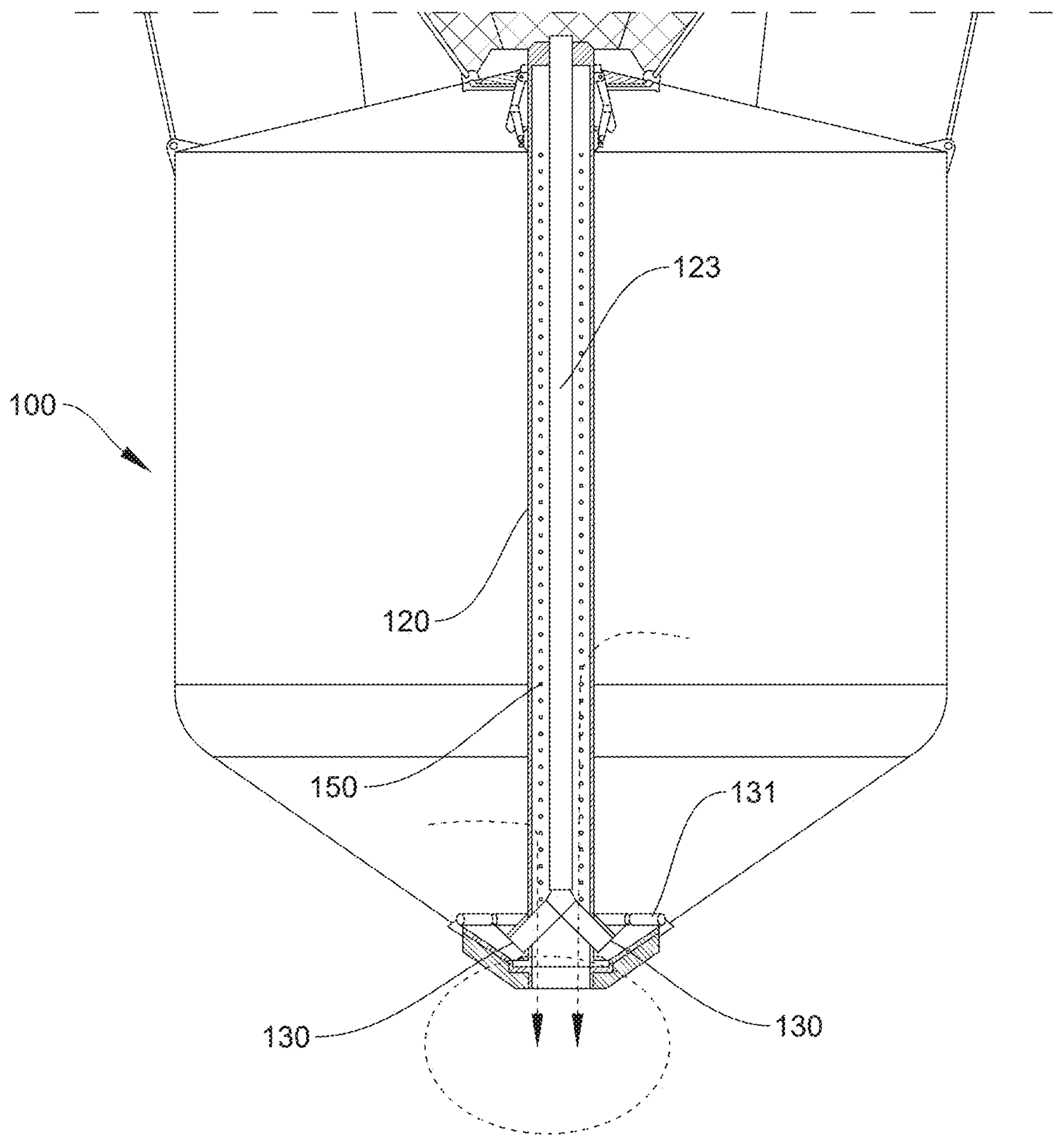
FIG. 10 is a cross-sectional side view of the underwater fish rearing tank shown in FIG. 1.

FIG. 10 is a cross-sectional side view of the underwater fish rearing tank 100 shown in FIG. 1. FIG. 10 illustrates how water in the tank is pressed through the discharge ports 150 in the central water discharge column 120. The discharge water is expelled through the lower end of the water discharge column 120. The inner tube 123 for dead fish removal extend along water discharge column 120 from the lower support plate to an outlet in the utility transition element.

Figure 11:
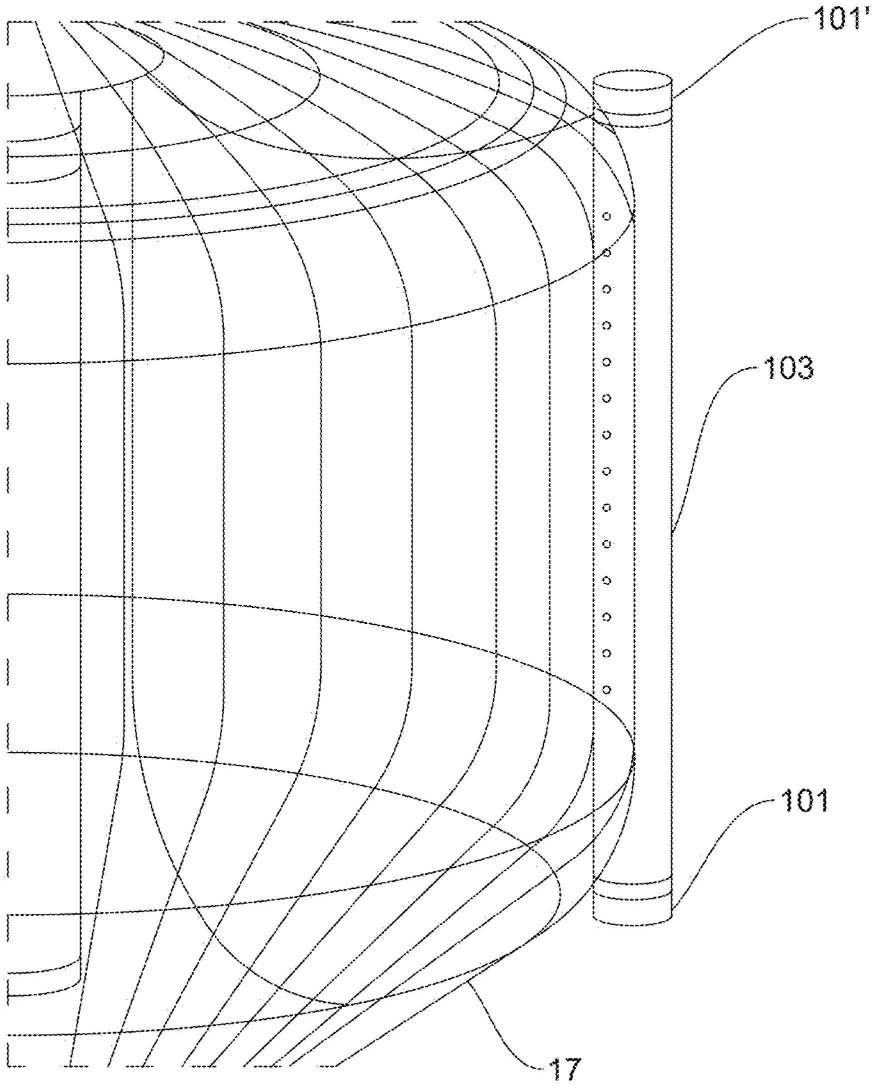
FIG. 11 is a perspective view of a portion of the fish rearing tank.

FIG. 11 is a perspective view of the underwater fish rearing tank 100. FIG. 11 shows how the water supply column 103 is attached to the exterior enclosure 17 and provides a more detailed view of the upper and lower water inlet pump units 101, 101'.

Figure 12:
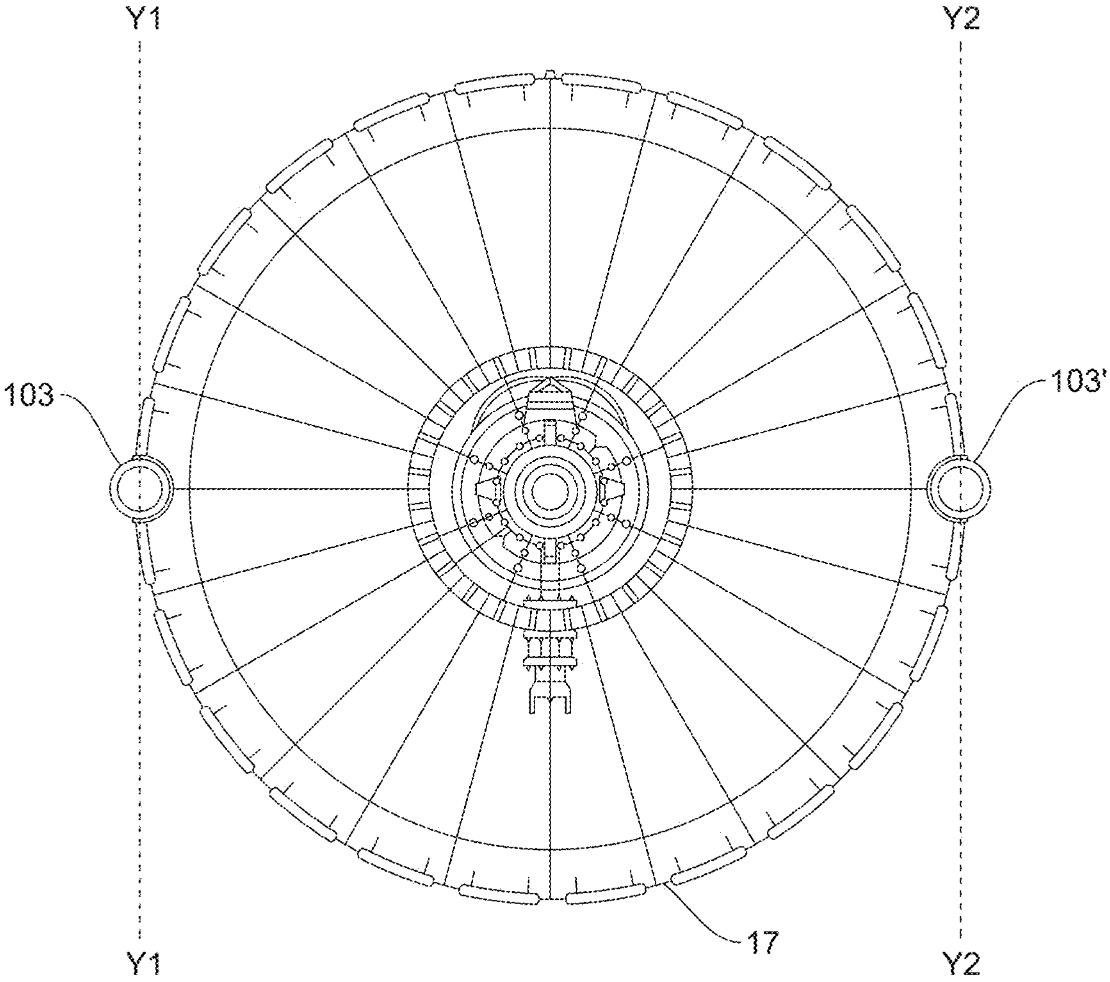
FIG. 12 is a perspective view of the underwater fish rearing tank.

FIG. 12 is an elevation of the underwater fish rearing tank 100. FIG. 12 shows how the water supply column nozzles 122 are angled to create a rotational water flow around the centre of the tank 100. The nozzles 122 are angled 10°-60° with respect to a tangential axis Y1, Y2. The velocity of the water flow and the rate of change of the water inside tank is adapted to the size of the fish and the amount of biomass in the tank.

It is a purpose with the present invention to provide a solution with an underwater fish rearing tank 100 completely filled with water, i.e., without a water surface and air inside the tank.

FIGURE REFERENCE OVERVIEW

| | |
|---|---|
| 10 | submersible fish farm |
| 11 | Float collar |
| 12 | Mooring point |
| 13 | Mooring line |
| 17 | Exterior enclosure |
| 100 | Underwater fish rearing tank |
| 101 | Lower water inlet pump unit |
| 101' | Upper water inlet pump unit |
| 103 | First water supply column |
| 103' | Second water supply column |
| 104 | Water sensor |
| 105 | Feed supply inlet |
| 106 | Ventilation tube |
| 109 | Camera |
| 110 | Utility transition element |
| 111 | Lower support plate |

-continued

| | |
|---|---|
| 112 | Upper light source |
| 112' | Lower light source |
| 113 | Auxiliary sensor |
| 114 | Water and waste outlet |
| 115 | Water and waste tubing |
| 116 | Feed supply tube |
| 118 | Air inlet element |
| 119 | Feed dispenser tube |
| 120 | Water discharge column |
| 122 | Water outlet nozzles |
| 123 | Inner tube |
| 130 | Vacuum inlet |
| 131 | Fluid dispenser ring |
| 132 | Fish inlet |
| 133 | Feed inlet |
| 134 | Ventilation valve |
| 135 | Waste outlet |
| 136 | Fish passage |
| 137 | Support plate nozzles |
| 138 | Excess gas chamber |
| 139 | Fish outlet |
| 140 | Membrane |
| 141 | Membrane segment |
| 143 | Support collar |
| 150 | Discharge ports |
| 151 | Impeller |
| 152 | Water discharge column outlet |
| 153 | Flow restriction or throttle |
| 154 | Ballast |

The invention claimed is:

1. A submersible fish rearing tank comprising:

an exterior enclosure made of a flexible material and forming a closed fish habitat;

a utility transition element providing a transition for at least one of a water inlet, a water outlet, a gas outlet, an air inlet, and connections for instrumentation, the utility transition element being fixed to the flexible exterior enclosure;

at least one first water pump unit adapted to pump water into the flexible exterior enclosure to provide a pressure inside the flexible exterior enclosure that exceeds a pressure acting on an outside of the flexible exterior enclosure;

a water discharge column having a water discharge column outlet at a lower end of the water discharge column, through which internal water is discharged from an interior of the flexible exterior enclosure, the water discharge column outlet including a flow restriction or throttle which restricts an outlet flow of the internal water and thereby builds hydrodynamic pressure within the flexible exterior enclosure; and a controller configured to control the at least one first water pump and the flow restriction or throttle such that the hydrodynamic pressure built by the flow restriction or throttle together with the pressure provided by the at least one first water pump unit keeps the flexible exterior enclosure inflated and stretched out so as to maximize an internal volume and maintain rigidity of the flexible exterior enclosure, and so as to maintain a pressure inside the flexible exterior enclosure that exceeds the pressure acting on the outside of the flexible exterior enclosure.

2. The submersible fish rearing tank of claim 1, further comprising:

a lower support plate; and a first inlet water supply column with nozzles adapted to provide water into the flexible exterior enclosure, the first inlet water supply column being fixed in relation to the exterior enclosure, wherein the at least one first water pump unit is adapted to pump water into the flexible exterior enclosure through the first inlet water supply column via the nozzles, wherein the water discharge column extends along a central axis of the submersible fish rearing tank between the utility transition element and the lower support plate, and wherein the water discharge column includes a plurality of discharge ports in a discharge column wall.

3. The submersible fish rearing tank of claim 2, further comprising a second inlet water supply column with nozzles adapted to supply water into the flexible exterior enclosure, and at least one second water pump unit configured to pump water into the flexible exterior enclosure through the second inlet water supply column via the nozzles of the second inlet water supply column, each of the first and second inlet water supply columns being tubular.

4. The submersible fish rearing tank of claim 3, wherein the at least one first water pump unit comprises two first water pump units adapted to pump water into the flexible exterior enclosure through the first inlet water supply column, and the at least one second water pump unit comprises two second water pump units configured to pump water into the flexible exterior enclosure through the second inlet water supply column.

5. The submersible fish rearing tank of claim 3, wherein for each of the first and second inlet water supply columns, the nozzles adapted to supply water into the flexible exterior enclosure are directed with a tangential component inside the flexible exterior enclosure to generate a circular or spiral shaped waterflow inside the flexible exterior enclosure in a direction from an inner wall of the flexible exterior enclosure and towards the water discharge column.

6. The submersible fish rearing tank of claim 3, further including an air inlet element at a lower part of the submersible fish rearing tank.

7. The submersible fish rearing tank of claim 3, wherein the water discharge column further includes at least one inner tube extending along the water discharge column from the lower support plate to the utility transition element.

8. The submersible fish rearing tank of claim 2, wherein the nozzles adapted to provide water into the flexible exterior enclosure are directed with a tangential component inside the flexible exterior enclosure to generate a circular or spiral shaped waterflow inside the flexible exterior enclosure in a direction from an inner wall of the flexible exterior enclosure and towards the water discharge column.

9. The submersible fish rearing tank of claim 2, further including an air inlet element at a lower part of the submersible fish rearing tank.

10. The submersible fish rearing tank of claim 2, wherein the water discharge column further includes at least one inner tube extending along the water discharge column from the lower support plate to the utility transition element.

11. The submersible fish rearing tank of claim 2, wherein the flow restriction or throttle restricts or completely closes the outlet water flow from the water discharge column outlet.

12. The submersible fish rearing tank of claim 1, further including an air inlet element at a lower part of the submersible fish rearing tank.

13. The submersible fish rearing tank of claim 1, wherein the water discharge column furthermore includes at least one inner tube extending along the water discharge column from a lower support plate to the utility transition element.

14. The submersible fish rearing tank of claim 1, wherein the flow restriction or throttle restricts or completely closes the outlet water flow from the water discharge column outlet.

15. The submersible fish rearing tank of claim 1, further including a ballast and an adjustable buoyancy element configured to orient and maintain a buoyancy of the submersible fish rearing tank.

16. The submersible fish rearing tank of claim 1, further comprising two tubular inlet water supply columns, each tubular inlet water supply column including nozzles adapted to supply water to an inside of the flexible exterior enclosure, and at least one pump unit, wherein the at least one pump unit of one of the two tubular inlet water supply columns includes the first water pump unit.

17. The submersible fish rearing tank of claim 16, wherein for each of the two tubular inlet water supply columns, the at least one pump unit comprises two pump units.

18. The submersible fish rearing tank of claim 17, wherein for each of the two tubular inlet water supply columns, the nozzles adapted to supply water into the flexible exterior are directed with a tangential component inside the flexible exterior enclosure to generate a circular or spiral shaped waterflow inside the flexible exterior enclosure in a direction from an inner wall of the flexible exterior enclosure and towards the water discharge column.

19. The submersible fish rearing tank of claim 16, wherein for each of the two tubular inlet water supply columns, the nozzles adapted to supply water into the flexible exterior enclosure are directed with a tangential component inside the flexible exterior enclosure to generate a circular or spiral shaped waterflow inside the flexible exterior enclosure in a direction from an inner wall of the flexible exterior enclosure and towards the water discharge column.

20. A method of operating a submersible fish rearing tank, wherein the submersible fish rearing tank includes an exterior enclosure made of a flexible material and forming a closed fish habitat, a utility transition element providing a transition for at least one of a water inlet, a water outlet, a gas outlet, an air inlet, and connections for instrumentation, the utility transition element being fixed to the flexible exterior enclosure, a first water pump unit adapted to pump water into the flexible exterior enclosure to provide a pressure inside the flexible exterior enclosure that exceeds a pressure acting on an outside of the flexible exterior enclosure, a water discharge column having a water discharge column outlet at a lower end of the water discharge column, through which internal water is discharged from an interior of the flexible exterior enclosure, the water discharge column outlet including a flow restriction or throttle which restricts an outlet flow of the internal water and thereby builds hydrodynamic pressure within the flexible exterior enclosure, a controller configured to control the first water pump unit and the flow restriction or throttle such that the hydrodynamic pressure built by the flow restriction or throttle together with the pressure provided by the first water pump unit keeps the flexible exterior enclosure inflated and stretched out so as to maximize an internal volume and maintain rigidity of the flexible exterior enclosure, and so as to maintain a pressure inside the flexible exterior enclosure that exceeds the pressure acting on the outside of the flexible exterior enclosure, and a ballast and an adjustable buoyancy element configured to orient and maintain a buoyancy of the submersible fish rearing tank, the method comprising:

controlling the flow restriction or throttle in coordination with the first water pump unit to maintain one of a substantially constant pressure and a constant flow inside the flexible exterior enclosure while changing one of a waterflow through the first water pump unit and the flow restriction or throttle.

21. A method of operating a submersible fish rearing tank, wherein the submersible fish rearing tank includes an exterior enclosure made of a flexible material and forming a closed fish habitat, a utility transition element providing a transition for at least one of a water inlet, a water outlet, a gas outlet, an air inlet, and connections for instrumentation, the utility transition element being fixed to the flexible exterior enclosure, a first water pump unit adapted to pump water into the flexible exterior enclosure to provide a pressure inside the flexible exterior enclosure that exceeds a pressure acting on an outside of the flexible exterior enclosure, a water discharge column having a water discharge column outlet at a lower end of the water discharge column, through which internal water is discharged from an interior of the flexible exterior enclosure, the water discharge column outlet including a flow restriction or throttle which restricts an outlet flow of the internal water and thereby builds hydrodynamic pressure within the flexible exterior enclosure, and a ballast and an adjustable buoyancy element configured to orient and maintain a buoyancy of the submersible fish rearing tank, the method comprising:

controlling the flow restriction or throttle in coordination with the first water pump unit to maintain one of a substantially constant pressure and a constant flow inside the flexible exterior enclosure while manually changing one of a waterflow through the first water pump unit and a waterflow through the flow restriction or throttle, such that the hydrodynamic pressure built by the flow restriction or throttle together with the pressure provided by the first water pump unit keeps the flexible exterior enclosure inflated and stretched out so as to maximize an internal volume and maintain rigidity of the flexible exterior enclosure, and so as to maintain a pressure inside the flexible exterior enclosure that exceeds the pressure acting on the outside of the flexible exterior enclosure.

* * * * *